United States Patent
Kobayashi

(10) Patent No.: US 7,852,569 B2
(45) Date of Patent: Dec. 14, 2010

(54) INTERNAL FOCUSING ZOOM LENS

(75) Inventor: Takahiro Kobayashi, Saitama (JP)

(73) Assignee: Hoya Corporation, Tokyo (JP)

( * ) Notice: Subject to any disclaimer, the term of this patent is extended or adjusted under 35 U.S.C. 154(b) by 259 days.

(21) Appl. No.: 12/260,356

(22) Filed: Oct. 29, 2008

(65) Prior Publication Data

US 2009/0116122 A1    May 7, 2009

(30) Foreign Application Priority Data

Nov. 2, 2007   (JP)   ............... 2007-286033

(51) Int. Cl.
*G02B 15/14* (2006.01)
(52) U.S. Cl. .................. 359/699; 359/704
(58) Field of Classification Search ........... 359/676, 359/677, 694, 699, 700, 701, 704
See application file for complete search history.

(56) References Cited

U.S. PATENT DOCUMENTS

| 6,631,035 | B2 | 10/2003 | Iikawa et al. | |
|---|---|---|---|---|
| 7,649,695 | B2 * | 1/2010 | Koyama et al. | 359/701 |
| 2004/0160683 | A1 | 8/2004 | Nomura et al. | |
| 2005/0254143 | A1 | 11/2005 | Saito et al. | |
| 2006/0034595 | A1 | 2/2006 | Yamazaki et al. | |
| 2006/0034596 | A1 | 2/2006 | Yamazaki et al. | |
| 2008/0252993 | A1 | 10/2008 | Eguchi | |

FOREIGN PATENT DOCUMENTS

| JP | 2000-89086 | 3/2000 |
|---|---|---|
| JP | 3461224 | 8/2003 |

* cited by examiner

*Primary Examiner*—Joseph Martinez
(74) *Attorney, Agent, or Firm*—Greenblum & Bernstein P.L.C.

(57) ABSTRACT

An internal focusing zoom lens includes a stationary barrel including a focus-guide cam groove; a zoom cam ring including a focus-shift cam groove and rotated about an optical axis during zooming; a focus cam ring including a focus cam groove and rotated about the optical axis and moved in the optical axis direction to move a focusing lens group during focusing; and a focus correction ring for moving the focus cam ring in the optical axis direction by rotation of the zoom cam ring. The focus correction ring includes a focus correction cam-follower engaged in the focus-shift cam groove, the focus cam groove and the focus-guide cam groove. A position of the focus correction cam-follower in the focus cam groove changes via the focus-shift cam groove and the focus-guide cam groove in accordance with the rotation of the zoom cam ring during zooming.

6 Claims, 7 Drawing Sheets

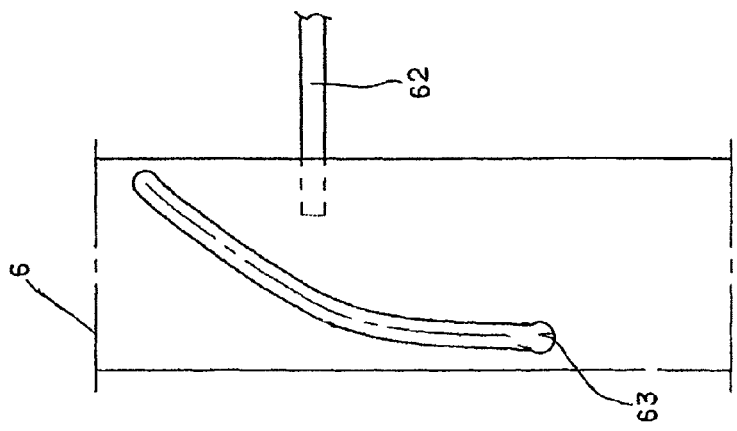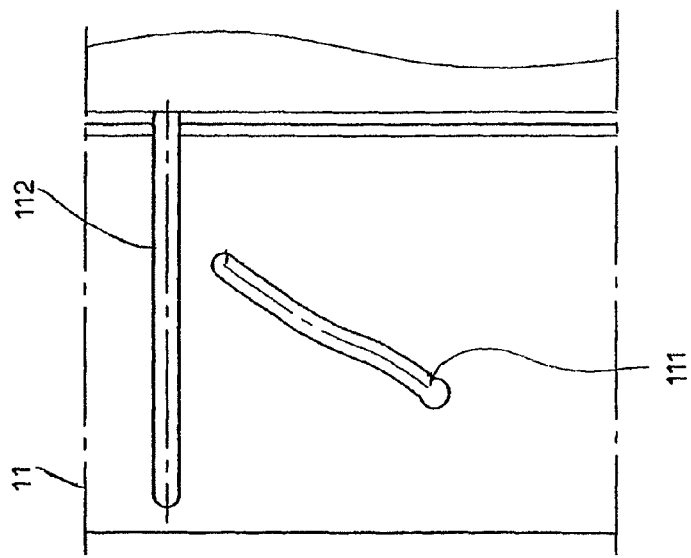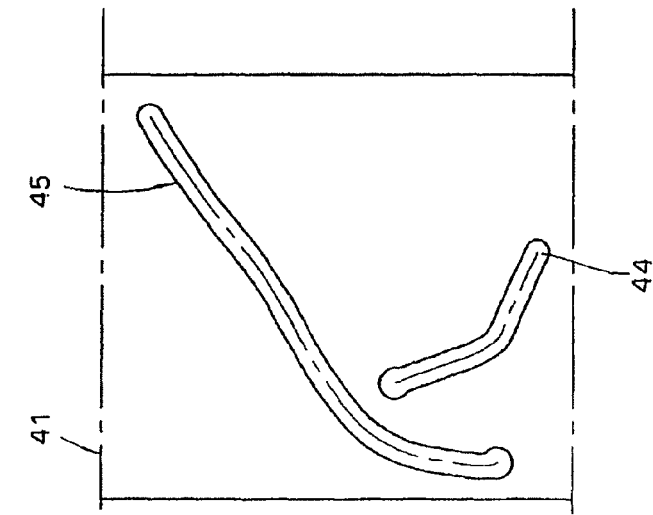

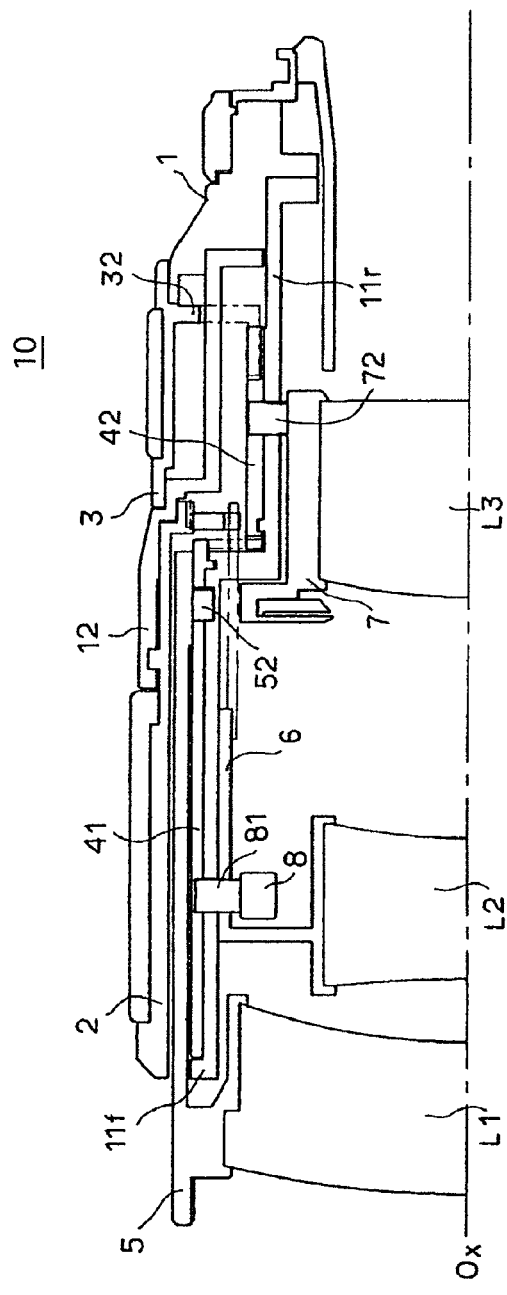
Fig.4A Wide Angle
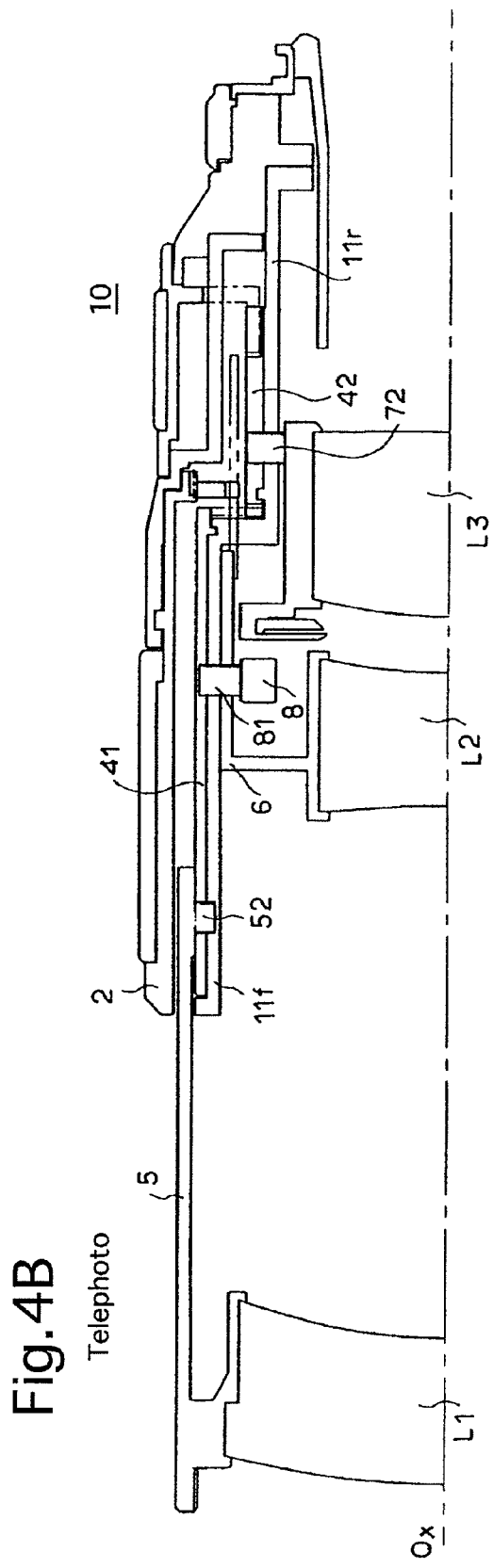
Fig.4B Telephoto

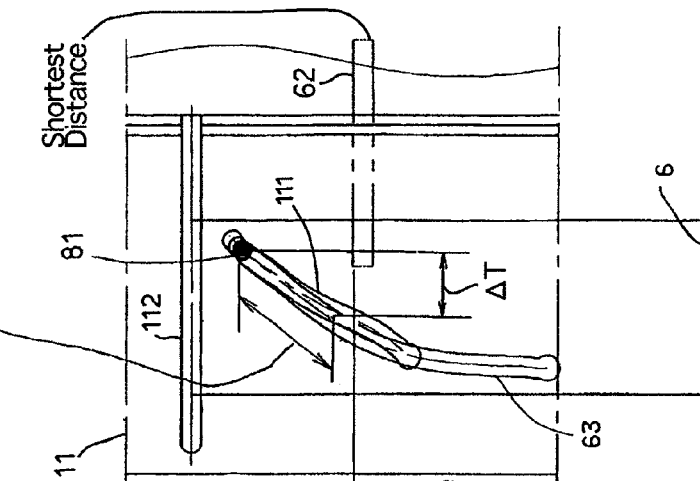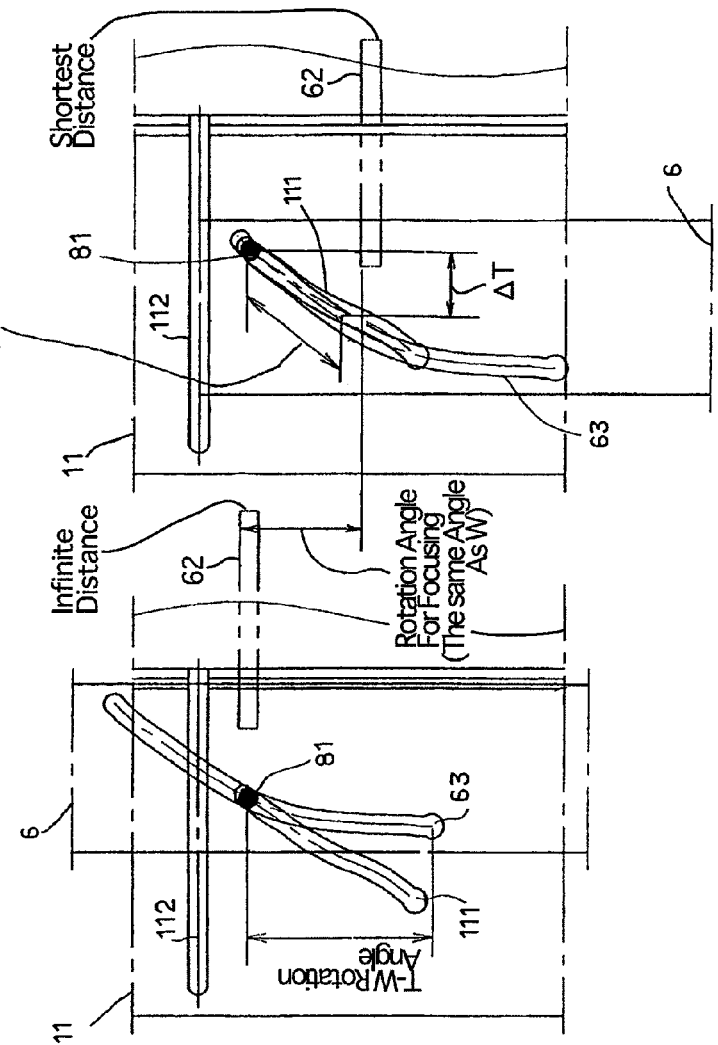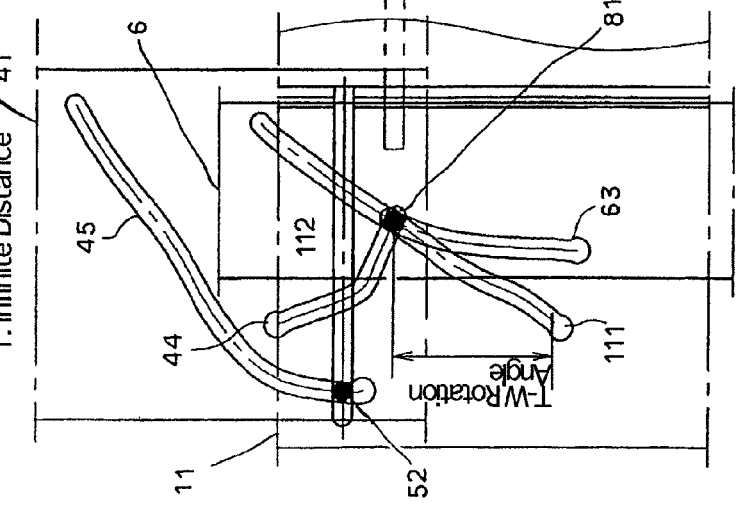

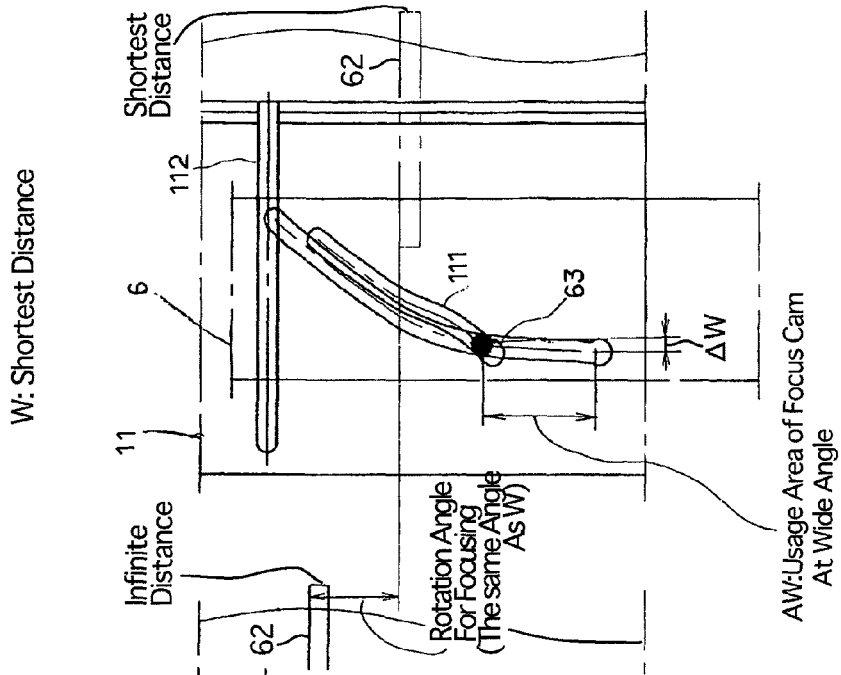
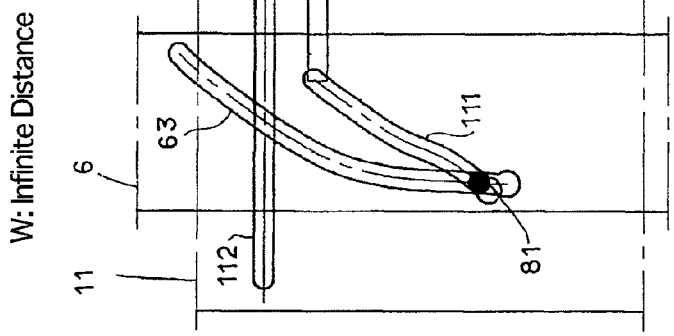
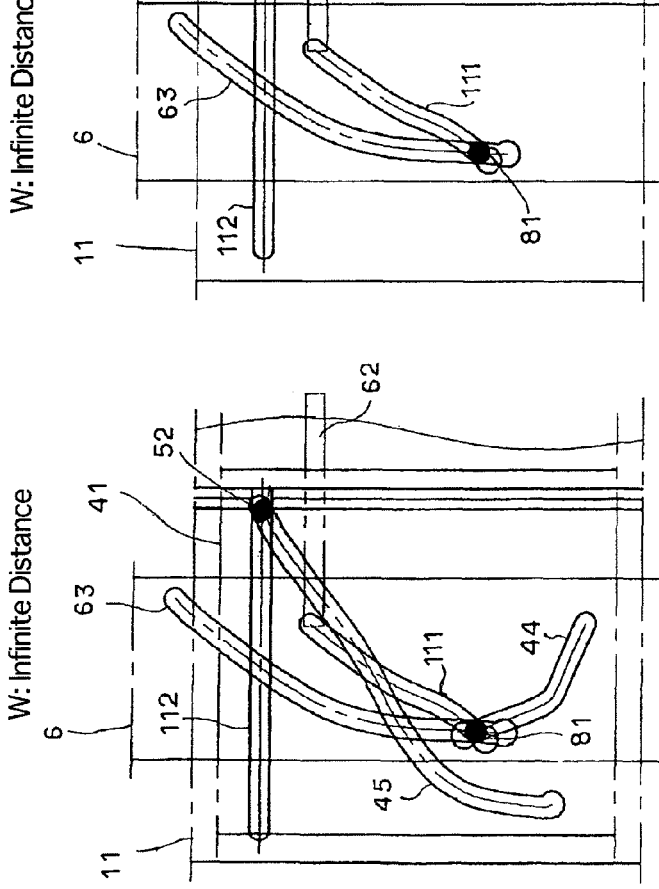

INTERNAL FOCUSING ZOOM LENS

BACKGROUND OF THE INVENTION

1. Field of the Invention

The present invention relates to an internal focusing zoom lens, more specifically to a high-power zoom lens in which the number of elements of the zoom lens is reduced while the structure thereof is simplified.

2. Description of the Related Art

In a zoom lens with a high zoom ratio (ratio of focal length variation), if the zoom lens is a front-lens-group advancing type zoom lens in which a focusing operation is performed by advancing the front (frontmost) lens group, the effective aperture of the front lens group becomes extremely large, which causes an increase in size of the mechanism for moving the front lens group. This causes an increase in size of the zoom lens and also an increase in mass of the elements of the AF mechanism which are to be driven, thus causing an increase in driving load. As a consequence, a problem arises in which the focusing speed reduces. In consideration of this drawback, a lens barrel with an internal lens group as a focusing lens group, i.e., a so-called internal focusing zoom lens has been proposed. In an internal focusing zoom lens, the aforementioned problem does not arise because the focusing lens group is not large in diameter; however, there is a problem with a focal point on the same object varying when the focal length varies by a zooming operation. In addition, each of the focal point at infinite distance and the focal point at the shortest distance varies by a variation in focal length of the zoom lens, and accordingly, there is a problem with the range of movement of the focusing lens group also varying when a focusing operation is performed. In order to overcome such a problem, conventional zoom lenses are provided with a focusing-lens-group advancing mechanism for originally changing the amount of movement of the focusing lens group in association with a zooming operation.

For instance, the zoom lens disclosed in Japanese Unexamined Patent Publication 2000-89086 (hereinafter referred to as Patent Document 1) is provided with a correction cam separately from a focus cam adopted to move a focusing lens group, and the correction cam is driven with the focus cam in association with a zooming operation to move the focusing lens group to an in-focus position.

Additionally, in Japanese Patent Document No. 3461224 (hereinafter referred to as Patent Document 2), the amount of movement of a focusing lens group is adjusted by moving a focus cam in an optical axis direction in association with a zooming operation to thereby change the usage area of the camming portion of the focus cam in response to variations of focal length, wherein the focus cam is for moving the focusing lens group when a focusing operation is performed.

In the technology disclosed in Patent Document 1, the correction cam is required in addition to the zoom cam and the focus cam, and accordingly, there is a problem with the number of elements of the zoom lens increasing. In particular, the correction cam needs to be positioned to be radially overlaid on the focus cam, which increases the diameter of the zoom lens. This increase becomes an obstacle to the design and production of a small-diameter zoom lens.

In the technology disclosed in Patent Document 2, it is advantageous for achieving a reduction in the number of elements of the zoom lens because no correction cam is required. However, in Patent Document 2, to drive a mechanism for moving the front lens group that is positioned radially outside of the focus cam, it is necessary to drive this moving mechanism by the focus cam that is moved by a zooming operation since the zoom cam is positioned radially inside of the focus cam. Therefore, to this end, the focus cam needs to be provided with the following two mechanisms: a mechanism for moving the focusing lens group via the zoom cam (e.g., a set of cam follower pins which engage with an associated set of cam grooves formed on the zoom cam), and a mechanism for moving the front lens group when the focus cam is moved by the zoom cam (e.g., a set of cam follower pins which engage with both a set of cam grooves of the focus cam and a set of cam grooves of a cam member for moving the front lens group). Therefore, according even to the technology disclosed in Patent Document 2, an increase in the number of elements of such two mechanisms cannot be avoided, which becomes an obstacle to the design and production of a small-diameter zoom lens just as in the case of Patent Document 1.

SUMMARY OF THE INVENTION

The present invention provides a small-size, small-diameter and high-power zoom lens in which a reduction in the number of elements is achieved while the structure is simplified.

According to an aspect of the present invention, an internal focusing zoom lens is provided, including a stationary barrel including a focus-guide cam groove; a zoom cam ring including a focus-shift cam groove, the zoom cam ring being rotated about an optical axis when a zooming operation is performed; a focus cam ring including a focus cam groove, the focus cam ring being rotated about the optical axis and moved in the optical axis direction to move a focusing lens group in the optical axis direction when a focusing operation is performed; and a focus correction ring for moving the focus cam ring in the optical axis direction by rotation of the zoom cam ring. The focus correction ring includes a focus correction cam-follower engaged in the focus-shift cam groove, the focus cam groove and the focus-guide cam groove. A position of the focus correction cam-follower in the focus cam groove changes via the focus-shift cam groove and the focus-guide cam groove in accordance with the rotation of the zoom cam ring when the zooming operation is performed.

According to the present invention, rotating the zoom cam ring to vary the focal length of the zoom lens causes the focus cam ring to rotate via the focus correction cam-follower, thus causing the position of the focus correction cam-follower in the focus cam groove to vary. Therefore, when a focusing operation is performed by a rotation of the focus cam ring, the range of movement of the focus correction cam-follower in the focus cam groove is changed, so that the position of the focusing lens group and the amount of movement thereof are changed. This makes it possible to correct the focus range and the focal point of the focusing lens group in an appropriate manner in response to focal length variations of the zoom lens. Additionally, according to the present invention, in addition to the focus cam ring, the zoom cam ring and the stationary barrel, which are similar to those provided in conventional zoom lenses, the zoom lens only needs to be provided with the focus correction cam-follower; and hence the length of the focus correction ring in the optical axis direction can be reduced so that miniaturization of the zoom lens becomes possible. Moreover, upon assembly of the zoom lens also, only the focus correction cam-follower needs to be brought into engagement with each cam ring, which makes it possible to simplify the assembly work.

It is desirable to satisfy the following four conditions (1) to (4) to achieve effective zooming and focusing operations in the zoom lens according to the present invention.

(1) Construct the focus correction ring so as to change the position of engagement of the focus correction cam-follower in the focus cam groove in accordance with a variation in rotation position of the zoom cam ring when the focus correction ring is rotated.

(2) Construct the focus-shift cam groove so as to change the position of the focus correction cam-follower in the focus cam groove in a direction of rotation of the focus correction cam-follower in accordance with a variation in rotation position of the zoom cam ring.

(3) Construct the focus-guide cam groove so as to limit the angle of rotation of the focus correction cam-follower when the zoom cam ring is rotated between a long-focal-length position and a short-focal-length position.

(4) Forming the focus cam groove so that the amount of movement of the focus correction cam-follower in the optical axis direction of the zoom lens changes per every predetermined amount of rotation of the focus cam ring, on which the focus cam groove is formed.

In the zoom lens according to the present invention, the focus cam ring, the stationary barrel and the zoom cam ring are concentrically arranged close to one another in that order in a radial direction from the radially inner side to the radially outer side, and the focus correction ring is positioned radially inside the focus cam ring. In the case of the internal focusing zoom lens, if a structure is adopted wherein a lens group positioned in front of the focusing lens group is moved in the optical axis direction of the zoom lens by an operation of the zoom cam ring, it is desirable that the zoom cam ring be positioned radially outside of the focus cam ring. In addition, positioning the focus correction ring radially inside the focus cam ring makes it possible to miniaturize the focus correction ring, thus being advantageous for miniaturization of the zoom lens.

The present disclosure relates to subject matter contained in Japanese Patent Application No. 2007-286033 (filed on Nov. 2, 2007) which is expressly incorporated herein by reference in its entirety.

BRIEF DESCRIPTION OF THE DRAWINGS

The present invention will be described below in detail with reference to the accompanying drawings in which:

FIG. 3A is a developed view of a portion of a first zoom cam ring of the lens barrel, showing the shapes of cam slots formed through the first zoom cam ring;

FIG. 3B is a developed view of a portion of a stationary barrel of the lens barrel, showing the shapes of a cam slot and a linear slot formed through the stationary barrel;

FIG. 3C is a developed view of a portion of a focus cam ring of the lens barrel, showing the shape of a cam slot formed through the focus cam ring;

FIG. 4A is a view similar to that of FIG. 1, showing the lens barrel set at a wide angle;

FIG. 4B is a view similar to that of FIG. 1, showing the lens barrel set at a telephoto angle;

FIGS. 5A, 5B and 5C are developed views of elements of the lens barrel, illustrating operations thereof when a focusing operation is performed at a telephoto angle;

FIGS. 6A, 6B and 6C are developed views of the elements of the lens barrel shown in FIGS. 5A, 5B and 5C, illustrating operations thereof when a focusing operation is performed at a wide angle.

DESCRIPTION OF THE PREFERRED EMBODIMENTS

A first embodiment of a lens barrel (specifically a zoom lens) according to the present invention will be hereinafter discussed with reference to FIGS. 1 through 6. In the following descriptions, "front" and "rear" designate the object side (left side with respect to FIG. 1) and the camera body side (right side with respect to FIG. 1), respectively.

Figure 1:
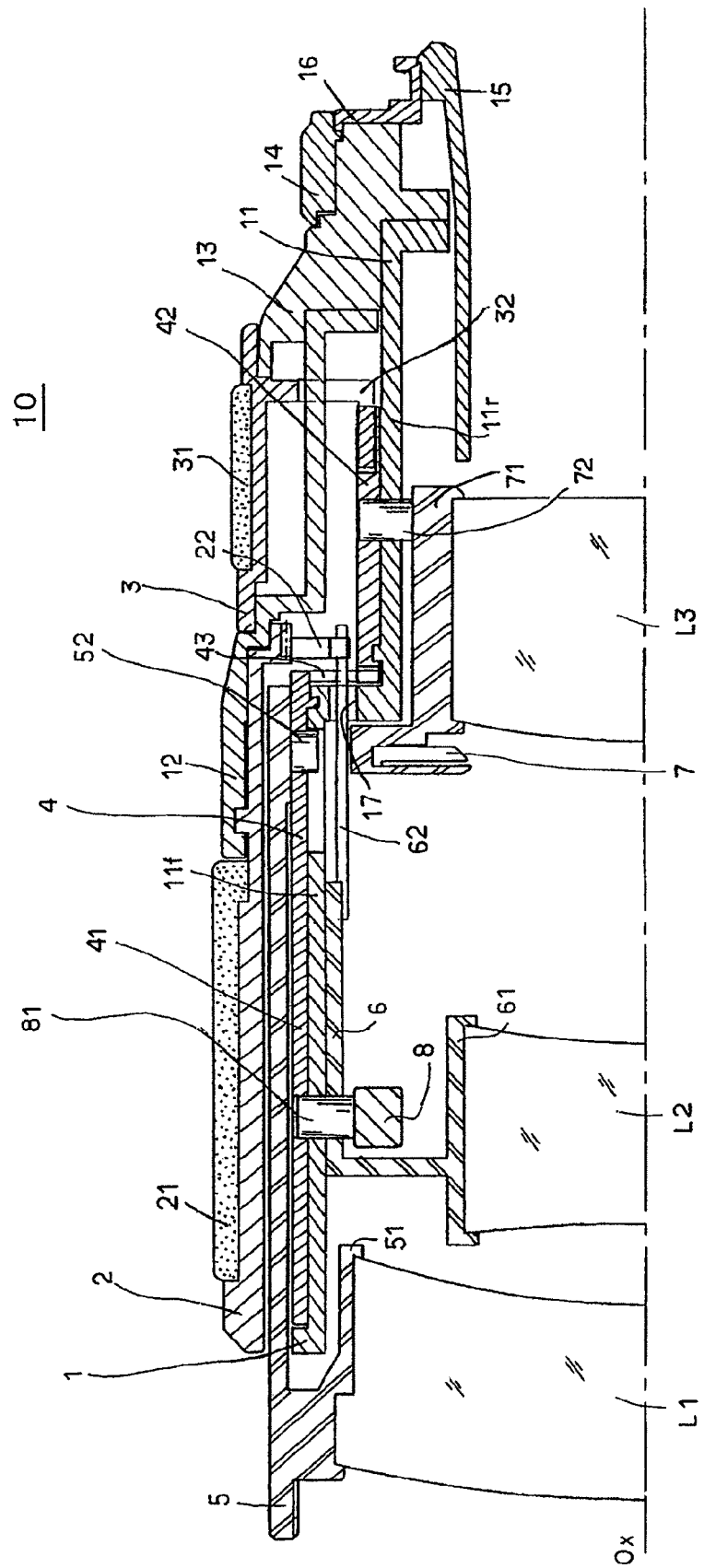
FIG. 1 is a longitudinal cross sectional view of a portion of a first embodiment of a lens barrel according to the present invention.

FIG. 1 is a longitudinal cross sectional view of an upper half of the zoom lens 10 from an optical axis Ox. The zoom lens 10 is designed as an interchangeable lens for SLR cameras. The first embodiment of the zoom lens 10 is an example of a zoom lens which contains a zoom lens system including a first lens group L1, a second lens group L2 and a third lens group L3.

The zoom lens 10 is provided with a stationary barrel 1 which is composed of an inner barrel 11 and an outer barrel 12 positioned radially outside of the inner barrel 11, with a predetermined gap provided between the inner barrel 11 and the outer barrel 12. The inner barrel 11 includes a front ring portion 11$f$ and a rear ring portion 11$r$ which are integral with each other. The front ring portion 11$f$ is positioned closer to the object side than the rear ring portion 11$r$. The rear ring portion 11$r$ is slightly smaller in diameter than the front ring portion 11$f$ and positioned closer to the camera body side than the rear ring portion 11$r$. The inner barrel 11 and the outer barrel 12 are joined at the rear ends thereof to a mount fixing ring 13 so as to be integral therewith. The zoom lens 10 is provided, at rear end thereof, with an aperture ring (aperture setting ring) 14 which is fitted on the mount fixing ring 13 to be rotatable about the optical axis Ox. A bayonet mount ring 16 is fixed to the rear end of the mount fixing ring 13, and a protective ring 15 is fixed to the bayonet mount ring 16 to be positioned radially inside of the rear ring portion 11$r$ of the inner barrel 11. The bayonet mount ring 16 can be detachably attached to the mount ring of an SLR camera body (not shown).

The zoom lens 10 is provided around the front outer periphery thereof with a focus ring (manual operation ring) 2, the rear portion of which is fitted into a front portion of the outer barrel 12, and this front portion of the outer barrel 12 supports the focus ring 2 to allow the focus ring 2 to rotate about the optical axis Ox relative to the outer barrel 12. A distance scale ring 21 is fixedly fitted on an outer peripheral surface of the focus ring 2. The zoom lens 10 is provided around a rear portion of the outer barrel 12 with a zoom ring (manual operation ring) 3. The rear portion of the outer barrel 12 supports the zoom ring 3 to allow the zoom ring 3 to rotate about the optical axis Ox relative to the outer barrel 12. A rubber ring 31 is fixedly fitted on an outer peripheral surface of the zoom ring 3.

The zoom lens 10 is provided around the inner barrel 11 with a first zoom cam ring 41 which is fitted on the front ring portion 11$f$ of the inner barrel 11 to be rotatable relative to front ring portion 11$f$ about the optical axis Ox. The zoom lens 10 is further provided around the inner barrel 11 with a second zoom cam ring 42 which is fitted on the rear ring portion 11$r$ of the inner barrel 11 to be rotatable relative to the rear ring portion 11r about the optical axis Ox. The first zoom cam ring 41 is fixed at the rear end thereof to the front end of the second zoom cam ring 42 to be integral therewith so that the first zoom cam ring 41 and the second zoom cam ring 42 rotate as an integral zoom cam ring 4. The zoom ring 3 is provided at the rear end thereof with a zoom lever 32 which projects radially inwards to be engaged with a rear end portion of the second zoom cam ring 42 so that the second zoom cam ring 42 (and hence the zoom can ring 4) integrally rotates with the zoom ring 3.

The zoom lens 10 is provided radially inside the focus ring 2 with a first-lens-group support ring 5. The first-lens-group support ring 5 is fitted onto the first zoom cam ring 41 to be rotatable about the optical axis Ox and movable in the optical axis direction (i.e., along the optical axis Ox) relative to the first zoom cam ring 41. The first-lens-group support ring 5 is provided, radially inside thereof at front end of the first-lens-group support ring 5, with a first-lens-group support frame 51 which is formed as an integral part of the first-lens-group support ring 5. The first-lens-group support frame 51 supports the first lens group L1.

The zoom lens 10 is provided radially inside the front ring portion 11f of the inner barrel 11 with a focus cam ring 6 which is inserted into the front ring portion 11f of the inner barrel 11 to be rotatable about the optical axis Ox and movable in the optical axis direction relative to the inner barrel 11. The focus cam ring 6 is provided, radially inside thereof at the front end of the focus cam ring 6, with a second-lens-group support frame 61 which is formed as an integral part of the focus cam ring 6. The second-lens-group support frame 61 supports the second lens group L2. In the present embodiment of the zoom lens, the second lens group L2 serves as a focusing lens group for bringing an object into focus. The focus cam ring 6 is provided at the rear end thereof with a focus lever 62 which extends rearward in the optical axis direction, and the focus ring 2 is provided at the rear end thereof with a focus operation lever 22 which projects radially inwards to be engaged with the focus lever 62 so that the focus cam ring 6 integrally rotates with the focus ring 2. A circumferential slit 17 is formed through the boundary portion between the front ring portion 11f and the rear ring portion 11r of the inner barrel 11, a circumferential slit 43 is formed through the boundary portion between the first zoom cam ring 41 and the second zoom cam ring 42 of the zoom cam ring 4 to be positioned behind the circumferential slit 17, and the focus lever 62 extends rearward through the circumferential slits 17 and 43.

The zoom lens 10 is provided radially inside the rear ring portion 11r of the inner barrel 11 with a third-lens-group frame 71 which is fitted into the rear ring portion 11r to be movable in the optical axis direction relative to the rear ring portion 11r. The third-lens-group frame 71 is provided, radially inside thereof in the vicinity of the front end of the third-lens-group frame 71, with a diaphragm opening/closing ring 7. The diaphragm opening/closing ring 7 is for opening and closing sector blades (not shown) positioned immediately in front of the third lens group L3, and the mechanism for opening and closing sector blades via the diaphragm opening/closing ring 7 is well-known in the art, and accordingly, the detailed description of this mechanism will be omitted from the following descriptions.

Figure 2:
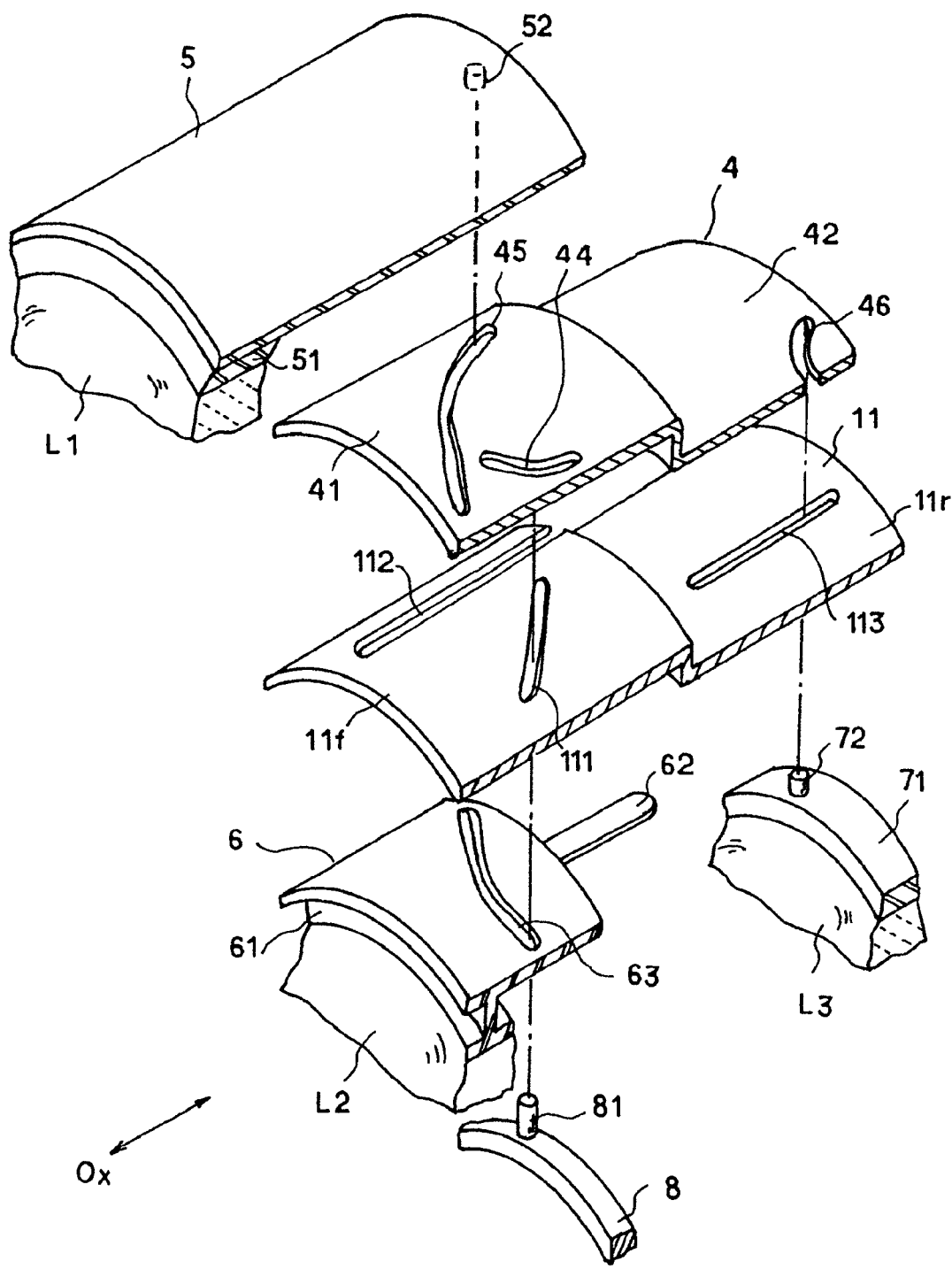
FIG. 2 is an exploded perspective view, partly in cross section, of a main portion of the lens barrel.

The details of a main portion of the zoom lens 10 in which the focus cam ring 6, the inner barrel 11, the first zoom cam ring 41, the second zoom cam ring 42 and the first-lens-group ring 5 are radially overlaid on one another are shown in FIG. 2, that shows an exploded perspective view of the main portion of the zoom lens 10.

FIG. 3A is a developed view of a portion of the first zoom cam ring 41. As shown in FIG. 3A, a focus-shift cam slot (cam groove) 44 and a first-lens-group control cam slot (cam groove) 45 are formed through the first zoom cam ring 41. The focus-shift cam slot 44 is formed in the front part of the first zoom cam ring 41 so as to extend in a direction inclined reversely with respect to the direction of the optical axis Ox at approximately 45 degrees, while the first-lens-group control cam slot 45 is formed across the first zoom cam ring 41 from the front part to the rear part thereof to extend in a direction inclined with respect to the direction of the optical axis Ox at approximately 45 degrees reversely and away from the direction of the focus-shift cam slot 44. FIG. 3B is a developed view of a portion of the inner barrel 11.

As shown in FIG. 3B, a focus-guide cam slot (cam groove) 111 and a first-lens-group control linear slot (linear groove) 112 are formed through the front ring portion 11f of the inner barrel 11. The focus-guide cam slot 111 is formed to extend in a direction inclined to the direction of the optical axis Ox at approximately 45 degrees, while the first-lens-group control linear slot 112 is formed to extend in the optical axis direction. Additionally, as shown in FIG. 2, a third-lens-group control linear slot (linear groove) 113 is formed through the rear ring portion 11r of the inner barrel 11.

FIG. 3C is a developed view of a portion of the focus cam ring 6. As shown in FIG. 3C, a focus cam slot (cam groove) 63 is formed through the focus cam ring 6. A front portion of the focus cam slot 63 is elongated along an angular direction substantially orthogonal to the direction of the optical axis Ox, and a rear portion of the focus cam slot 63 is elongated in a direction inclined with respect to the direction of the optical axis Ox at approximately 45 degrees.

As shown in FIG. 2, the first-lens-group control cam slot 45, the rear portion of the focus cam slot 63 and the focus-guide cam slot 111 are all formed to extend in a common inclination direction with respect to the optical axis Ox, while the focus-shift cam slot 44 is formed to extend in an opposite inclination direction to those of the cam slots 45, 63 and 111, with respect to the optical axis Ox.

Furthermore, the first-lens-group support frame 51 is provided, on an inner peripheral surface thereof in the vicinity of the rear end of the first-lens-group support frame 51, with a first-lens-group control roller (cam follower) 52 which projects radially inwards to extend through both the first-lens-group control cam slot 45 of the first zoom cam ring 41 and the first-lens-group control linear slot 112 of the inner barrel 11. In addition, the zoom lens 10 is provided, radially inside the focus cam ring 6, with a focus correction ring 8 which includes a focus correction roller (cam follower) 81. The focus correction roller 81 projects radially outwards to be engaged in the focus-shift cam slot 44 of the first zoom cam ring 41 via the focus cam slot 63 of the focus cam ring 6 and the focus-guide cam slot 111 of the inner barrel 11. Additionally, a second zoom cam slot (cam groove) 46 is formed through the second zoom cam ring 42, and the third-lens-group frame 71 is provided on an outer peripheral surface thereof with a third-lens-group control roller (cam follower) 72 which projects radially outwards to be engaged in the second zoom cam slot 46 of the second zoom cam ring 42 via the third-lens-group control linear slot 113 of the inner barrel 11.

In the above description, each of the above described cam slots (cam grooves) and linear slots, i.e., the focus-shift cam slot 44, the first-lens-group control cam slot 45, the second zoom cam slot 46, the focus cam slot 63, the focus-guide cam slot 111, the first-lens-group control linear slot 112, the third-lens-group control linear slot 113, is only referred to in singular form; and also each of the third-lens-group control roller 72 and the focus correction roller 81, is only referred to in singular form for the purpose of illustration. However, in reality, more than one of each of the cam slots and more than one of each of the rollers, typically a set of three cam slots and a set of three rollers are provided correspondingly at three different circumferential positions in order to achieve a smooth camming operation between each roller and the associated linear slot and cam slots.

In the zoom lens 10 that has the above described structure, firstly, operations of the zoom lens 10 when a zooming operation is carried out will be discussed thereinafter. Manually rotating the zoom ring 3 causes the second zoom cam ring 42 and the first zoom cam ring 41 to rotate integrally via the zoom lever 32. This rotation of the first zoom cam ring 41 causes the first-lens-group control roller 52, which is engaged in both the first-lens-group control cam slot 45 of the first zoom cam ring 41 and the first-lens-group control linear slot 112 of the inner barrel 11, to move in the optical axis direction. This movement of the first-lens-group control roller 52 causes the first-lens-group support ring 5 that is provided with the first-lens-group control roller 52 to move in the optical axis direction, thus causing the first lens group L1 to move in the optical axis direction.

In addition, the rotation of the first zoom cam ring 41 causes the focus correction roller 81, which is engaged in the focus cam slot 63 of the focus cam ring 6, the focus-guide cam slot 111 of the inner barrel 11 and the focus-shift cam slot 44 of the first zoom cam ring 41, to rotate about the optical axis Ox and also move in the optical axis direction. In addition, this rotation of the focus correction roller 81 causes the focus cam ring 6 to move in the optical axis direction also, thus causing the second lens group L2 that is supported by the focus cam ring 6 to move in the optical axis direction.

Additionally, the rotation of the second zoom cam ring 42 causes the third-lens-group control roller 72 that is engaged in the second cam slot 46 to move in the optical axis direction along the third-lens-group control linear slot 113 of the inner barrel 11, thus causing the third lens group L3 to move in the optical axis direction.

This moves each of the first lens group L1, the second lens group L2 and the third lens group L3 forward or rearward along the optical axis Ox by a predetermined amount of movement between a wide-angle state W, at which the focal length is short, and a telephoto state T, at which the focal length is long, to set the zoom lens 10 to a target focal length as shown in FIGS. 4A and 4B.

Operations of the zoom lens 10 when a focusing operation is carried out will be discussed hereinafter. Referring to FIG. 1, manually rotating the focus ring 2 causes the focus cam ring 6 to rotate via the focus operation lever 22 and the focus lever 62. At this time, the first zoom cam ring 41 does not rotate unless the zoom ring 3 is manually rotated. Therefore, the focus cam ring 6 is moved in the optical axis direction while being rotated due to the focus correction roller 81 being engaged in both the focus cam slot 63 of the focus cam ring 6 and the focus-guide cam slot 111 of the inner barrel 11. Consequently, the second lens group L2, which is supported by the focus cam ring 6, moves in the optical axis direction to bring an object-image into focus.

In this manner, zooming and focusing are performed. Focusing operations at the telephoto state T and the wide-angle state W by zooming will be discussed hereinafter.

FIGS. 5A, 5B and 5C are diagrams showing the position of engagement of each roller with the associated cam slots of the first zoom cam ring 41, the inner barrel 11 of the stationary barrel 1 and the focus cam ring 6 when the zoom lens 10 is set at the telephoto state T. FIG. 5A shows a state where the zoom lens 10 is focused on an object at infinity in the state shown in FIG. 4B, in which the zoom lens 10 is set at the telephoto state T. In this state, via the first-lens-group control cam slot 45 of the first zoom cam ring 41 and the first-lens-group control linear slot 112 of the inner barrel 11, the first-lens-group control roller 52 is positioned at the front end of the first-lens-group control cam slot 45 while the first lens group L1 has been advanced forward. At this time, via the focus-shift cam slot 44 of the first zoom cam ring 41, the focus correction roller 81 has been moved to the rear end side of the focus-shift cam slot 44. Therefore, in order to show the positional relationship between only the focus-guide cam slot 111 of the inner barrel 11 and the focus cam slot 63 of the focus cam ring 6 in FIG. 5B, the focus correction roller 81 is positioned at the rear end of the focus-guide cam slot 111, at substantially the central position in the focus cam slot 63 in the direction of elongation thereof.

From this state, the focus cam ring 6 is rotated in the downward direction with respect to FIG. 5B to adjust a focus toward the minimum focal position by manually rotating the focus ring 2, and consequently, it is assumed that an in-focus state is achieved at the minimum focal distance as shown in FIG. 5C. At this time, since the focus cam ring 6 has been fully rotated downward with respect to FIG. 5C, the focus correction roller 81 has been moved to the rear end of the focus cam slot 63. In this manner, in the telephoto state T, the focus correction roller 81 is moved along the optical axis direction within a range AT (see FIG. 5C), which is defined between an intermediate position and the rear end position in the focus cam groove 63 in the direction of elongation thereof. Therefore, the amount of movement (advancement) of the second lens group L2 in the optical axis direction is ΔT, as shown in FIG. 5C, that corresponds to the length in the optical axis direction between the above-mentioned intermediate position and the rear end position of the focus correction roller 81 in the focus cam groove 63 (i.e., ΔT corresponds to the length in the optical axis direction of the range AT).

On the other hand, FIGS. 6A, 6B and 6C are diagrams showing the position of engagement of each roller with the associated cam slots of the first zoom cam ring 41, the inner barrel 11 and the focus cam ring 6 when the zoom lens 10 is set at the wide-angle state W. FIG. 6A shows a state where the zoom lens 10 is focused on an object at infinity in the state shown in FIG. 4A, in which the zoom lens 10 is set at the wide-angle state W. In this state, via the first-lens-group control cam slot 45 of the first zoom cam ring 41 and the first-lens-group control linear slot 112 of the inner barrel 11, the first-lens-group control roller 52 is positioned at the rear end of the first-lens-group control cam slot 45 while the first lens group L1 has been retracted. At this time, via the focus-shift cam slot 44 of the first zoom cam ring 41, the focus correction roller 81 has been moved to the front end of the focus-shift cam slot 44. Therefore, in order to show the positional relationship between only the focus-guide cam slot 111 of the inner barrel 11 and the focus cam slot 63 of the focus cam ring 6 in FIG. 6B, the focus correction roller 81 is positioned at the front end of the focus-guide cam slot 111 in the direction of elongation thereof, and also positioned in the vicinity of the front end of the focus cam slot 63 in the direction of elongation thereof.

From this state, the focus cam ring 6 is rotated in the downward direction with respect to FIG. 6B to adjust a focus toward the minimum focal position by manually rotating the focus ring 2, and consequently, it is assumed that an-focus state is achieved at the minimum focal distance as shown in FIG. 6C. At this time, since the focus cam ring 6 has been fully rotated downward with respect to FIG. 6C, the focus correction roller 81 has been moved to a position in the focus cam slot 63 in the vicinity of the central position therein. In this manner, in the wide-angle state W, the focus correction roller 81 is moved along the optical axis direction within a range AW (see FIG. 6C) which is defined between the front end position and an intermediate position in the focus cam groove 63 in the direction of elongation thereof. Therefore, the amount of movement (advancement) of the second lens group L2 in the optical axis direction becomes ΔW, as shown in FIG. 6C, that corresponds to the length in the optical axis direction between the front end position and above-mentioned intermediate position of the focus correction roller 81 in the focus cam groove 63 (i.e., ΔW corresponds to the length in the optical axis direction of the range AW).

As described above, in a focusing operation performed by manually operating the focus ring 2, the second lens group L2 that serves as a focusing lens group is moved within the range AT that is a rear part of the focus cam slot 63 when the zoom lens 10 is in the telephoto state T, or the second lens group L2 is moved within the range AW that is a front part of the focus cam slot 63 when the zoom lens 10 is in the wide-angle state W. The focus cam slot 63 is designed so that the front part thereof has a large inclination angle and the rear part thereof has a small inclination angle with respect to the direction of the optical axis Ox, and accordingly, the amount of advancement of the second lens group L2 becomes large in the telephoto state T and small in the wide-angle state W of the zoom lens 10, respectively, even when the focus cam ring 6 is rotated by the same amount of rotation. This makes it possible to correct the focus range and the focal point of the second lens group L2 in an appropriate manner in response to focal length variations of the zoom lens 10.

In this manner, in the first embodiment of the lens barrel, with the focus correction ring 8 that includes the focus correction roller 81, manually rotating the zoom ring 2 to change the focal length of the zoom lens 10 causes the first zoom cam ring 41 to rotate, and this rotation of the first zoom cam ring 41 causes the focus cam ring 6 to rotate via the focus correction roller 81, thus changing predetermined positions of the focus cam ring 6, e.g., the position of the focus cam ring 6 in the optical axis direction and the rotation position of the focus cam ring 6 about the optical axis Ox at which the object distance is set at infinite distance. Therefore, in the subsequent focusing operation performed by manually operating the focus ring 2, even when the focus cam ring 6 is rotated by the same amount of rotation, the position of the second lens group L2 which functions as a focusing lens group and the amount of movement thereof in the optical axis direction vary, which enables an appropriate focus adjustment by the second lens group L2 possible.

In addition, in the first embodiment of the lens barrel, in addition to the focus cam ring 6, the zoom cam ring 4 and the stationary barrel 1, which are similar to those provided in conventional zoom lenses, the zoom lens 10 only needs to be provided with the focus correction ring 8 that includes the focus correction roller 81; moreover, since the focus correction ring 8 only needs to be provided with only one type of roller, i.e., the focus correction roller 81 (typically a set of three focus correction rollers 81) which is engaged in the focus cam slot 63, the focus-shift cam slot 44 and the focus-guide cam slot 111 all together, the length of the focus correction ring 8 in the optical axis direction can be very small while having a sufficient length to support the focus correction roller 81, and the internal space of the zoom lens 10 for the installation of the focus correction ring 8 can be minimalized. Therefore, as compared with the technology disclosed in Patent Document 2 that requires two sets of rollers (cam follower pins), a reduction in number of elements and miniaturization of the zoom lens 10 are achieved. Additionally, upon assembly of the zoom lens 10 also, only a set of focus correction rollers needs to be inserted into each set of cam slots (and also each set of control linear slots), which makes it possible to simplify the assembly work.

Figure 7:
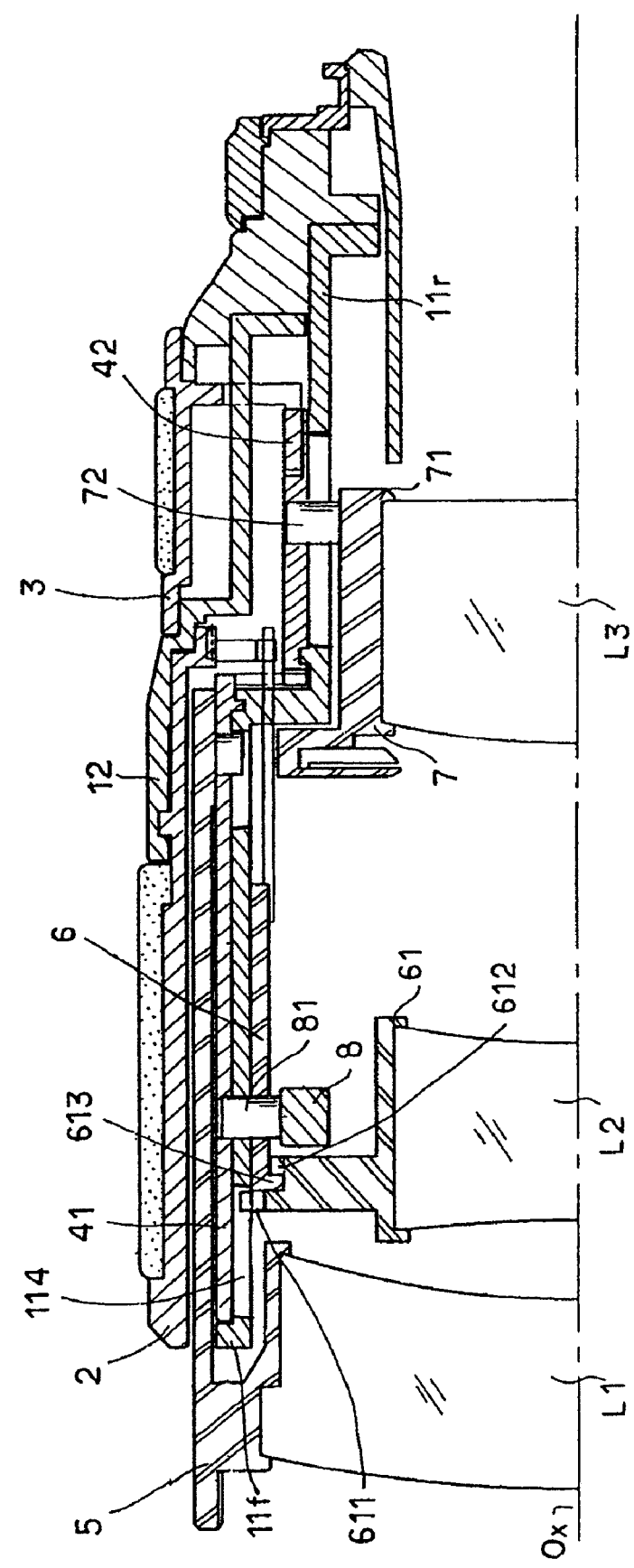
FIG. 7 is a longitudinal cross sectional view of a portion of a second embodiment of the lens barrel according to the present invention.

FIG. 7 is a cross sectional view of a second embodiment of a lens barrel 100, similar to that of FIG. 1 of the first embodiment of the lens barrel 10. Elements of the second embodiment of the lens barrel 100 which are similar to those of the first embodiment of the lens barrel are designated by the same reference numerals, and the detailed descriptions of the similar elements are omitted from the following descriptions. In the first embodiment of the lens barrel, the second lens group L2 is also rotated with the focus cam ring 6 about the optical axis Ox since the focus cam ring 6 is rotated when a zooming operation is performed and also when a focusing operation is performed. Whereas in the second embodiment of the lens barrel, the second lens group L2 is prevented from rotating. The second-lens-group support frame 61 is formed as a separate member from the focus cam ring 6, and the second-lens-group support frame 61 and the focus cam ring 6 are connected so as to be integral with each other in the optical axis direction while being allowed to rotate freely relative to each other via a bayonet structure wherein an inner flange 613 formed at the front end of the focus cam ring 6 is held in the optical axis direction between two projections (front and rear projections) 611 and 612 which project radially outwards from the front end of the second-lens-group support frame 61. In addition to this, the projection 611 is inserted into a second-lens-group control linear slot 114 formed through the inner ring 11 to prevent the second-lens-group support frame 61 from rotating.

With this structure, when the focus cam ring 6 moves in the optical axis direction while rotating during zooming or focusing, the second lens frame 61 is moved in the optical axis direction without rotating about the optical axis Ox via the above described bayonet structure and the second-lens-group control linear slot 114, so as to achieve an in-focus state. In the second embodiment of the lens barrel also, with the focus correction ring 8 that includes the focus correction roller 81, appropriate focusing is achieved by an operation of the second lens group L2 in response to focal length variations of the zoom lens 10. In addition, since the above described bayonet structure is obtained simply by providing the focus cam ring 6 and the second-lens-group support frame 61 as separate members, the number of elements of the zoom lens 10 does not particularly increase. Accordingly, similar to the first embodiment of the lens barrel, a small zoom lens with less number of elements is achieved.

Although the focus cam ring, the stationary barrel (the front ring portion of the inner ring) and the zoom cam ring (the first zoom cam ring) are concentrically arranged in that order from the radially inner side to the radially outer side while the focus correction roller is engaged in the cam slot formed through each of these annular members, it is possible for the arrangement of the focus cam ring, the stationary barrel and the zoom cam ring to be changed as appropriate depending on the arrangement of the plurality of lens groups of the zoom lens or the focusing lens group thereof. Furthermore, the shape of each cam slot formed in each cam ring or the inner ring of the stationary barrel is not limited to that shown in each of the first and second embodiments of the lens barrels.

The present invention is not limited solely to a zoom lens with a photographing optical system composed of three lens groups which is disclosed in the first or second embodiment of the lens group; the present invention is applicable to an internal focusing zoom lens, the photographing optical system of which is composed of two lens groups or more than three lens groups as long as the zoom lens is of a type including a zoom cam ring and a focus cam ring.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An internal focusing zoom lens comprising:
    a stationary barrel including a focus-guide cam groove;
    a zoom cam ring including a focus-shift cam groove, said zoom cam ring being rotated about an optical axis when a zooming operation is performed;
    a focus cam ring including a focus cam groove, said focus cam ring being rotated about said optical axis and moved in said optical axis direction to move a focusing lens group in said optical axis direction when a focusing operation is performed; and
    a focus correction ring for moving said focus cam ring in said optical axis direction by rotation of said zoom cam ring,
    wherein said focus correction ring includes a focus correction cam-follower engaged in said focus-shift cam groove, said focus cam groove and said focus-guide cam groove, and
    wherein a position of said focus correction cam-follower in said focus cam groove changes via said focus-shift cam groove and said focus-guide cam groove in accordance with said rotation of said zoom cam ring when said zooming operation is performed.

2. The internal focusing zoom lens according to claim 1, wherein said focus correction ring is configured to vary a position of engagement of said focus correction cam-follower with said focus cam groove in accordance with a variation in rotation position of said zoom cam ring when said focus correction ring is rotated.

3. The internal focusing zoom lens according to claim 1, wherein said focus-shift cam groove comprises a profile via which a position of said focus correction cam-follower is varied in a rotation direction thereof in said focus cam groove in accordance with a variation in rotation position of said zoom cam ring.

4. The internal focusing zoom lens according to claim 1, wherein said focus-guide cam groove comprises a profile which limits an angle of rotation of said focus correction cam-follower when said zoom cam ring is rotated between a long-focal-length position and a short-focal-length position.

5. The internal focusing zoom lens according to claim 1, wherein said focus cam groove comprises a profile via which an amount of movement of said focus correction cam-follower is varied in said optical axis direction per every predetermined amount of rotation of said focus cam ring.

6. The internal focusing zoom lens according to claim 1, wherein said focus cam ring, said stationary barrel and said zoom cam ring are concentrically arranged closely to one another in that order from a radially inner side to a radially outer side, and
    wherein said focus correction ring is positioned radially inside said focus cam ring.

* * * * *